United States Patent
Hildebrand et al.

(10) Patent No.: US 10,296,436 B2
(45) Date of Patent: May 21, 2019

(54) ADJUSTING TRACE POINTS BASED ON OVERHEAD ANALYSIS

(71) Applicant: International Business Machines Corporation, Armonk, NY (US)

(72) Inventors: Dean Hildebrand, Bellingham, WA (US); Vasily Tarasov, Port Jefferson Station, NY (US)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 15/260,054

(22) Filed: Sep. 8, 2016

(65) Prior Publication Data

US 2018/0067835 A1    Mar. 8, 2018

(51) Int. Cl.
   *G06F 11/00* (2006.01)
   *G06F 11/34* (2006.01)
   *G06F 11/30* (2006.01)

(52) U.S. Cl.
   CPC ...... *G06F 11/3495* (2013.01); *G06F 11/3006* (2013.01); *G06F 11/3024* (2013.01); *G06F 11/3466* (2013.01)

(58) Field of Classification Search
   CPC ............ G06F 11/3495; G06F 11/3003; G06F 11/3024; G06F 11/3072; G06F 11/3065; G06F 11/34; G06F 11/3466; G06F 11/3006
   See application file for complete search history.

(56) References Cited

U.S. PATENT DOCUMENTS

| | | | |
|---|---|---|---|
| 6,546,548 B1* | 4/2003 | Berry | G06F 11/3466 717/128 |
| 7,827,539 B1 | 11/2010 | Wygodny et al. | |
| 9,137,136 B2 | 9/2015 | Malloy et al. | |
| 2008/0126828 A1 | 5/2008 | Girouard et al. | |
| 2010/0083237 A1* | 4/2010 | Kneebone | G06F 8/443 717/128 |
| 2011/0067008 A1 | 3/2011 | Srivastava et al. | |
| 2013/0283281 A1* | 10/2013 | Krajec | G06F 11/3433 718/102 |
| 2014/0317454 A1* | 10/2014 | Gataullin | G06F 11/3636 714/45 |

OTHER PUBLICATIONS

Mohror et al., "Trace Profiling: scalable Event Tracing on High-End Parallel Systems," Parallel Computing 38, No. 4, 2012, pp. 194-225.

* cited by examiner

*Primary Examiner* — Joseph D Manoskey
(74) *Attorney, Agent, or Firm* — Zilka-Kotab, P.C.

(57) ABSTRACT

A computer-implemented method according to one embodiment includes identifying an overhead associated with a tracing of a system, comparing the overhead to a predetermined threshold, and adjusting a number of trace points currently enabled within the system, based on the comparing.

14 Claims, 5 Drawing Sheets

ADJUSTING TRACE POINTS BASED ON OVERHEAD ANALYSIS

BACKGROUND

The present invention relates to system analysis, and more specifically, this invention relates to improving system performance while running a software program.

One of the most powerful methods for understanding how a system functions is tracing. In its essence, tracing is a process of collecting records from the strategically placed trace points in the code when a processor executes them.

Tracing may provide an insightful view inside of a production system. But the overhead caused by tracing may be prohibitive. For example, forming the trace records may add CPU overhead. Also, storing trace records in RAM may require both RAM bandwidth and space. Further, long traces may have to be written to the disk, which may use I/O bandwidth and disk space. Finally, in a distributed setup, traces may need to be transferred to other nodes for analysis, which may consume network bandwidth.

SUMMARY

A computer-implemented method according to one embodiment includes identifying an overhead associated with a tracing of a system, comparing the overhead to a predetermined threshold, and adjusting a number of trace points currently enabled within the system, based on the comparing.

According to another embodiment, a computer program product for adjusting a number of trace points currently enabled within a system, based on an analysis of an overhead, comprises a computer readable storage medium having program instructions embodied therewith, wherein the computer readable storage medium is not a transitory signal per se, and where the program instructions are executable by a processor to cause the processor to perform a method comprising identifying the overhead associated with a tracing of a system, utilizing the processor, comparing the overhead to a predetermined threshold, utilizing the processor, and adjusting the number of the trace points currently enabled within the system, utilizing the processor, based on the comparing.

A system according to another embodiment includes a processor, and logic integrated with the processor, executable by the processor, or integrated with and executable by the processor, the logic being configured to identify an overhead associated with a tracing of a system, compare the overhead to a predetermined threshold, and adjust a number of trace points currently enabled within the system, based on the comparison.

Other aspects and embodiments of the present invention will become apparent from the following detailed description, which, when taken in conjunction with the drawings, illustrate by way of example the principles of the invention.

DETAILED DESCRIPTION

The following description discloses several preferred embodiments of systems, methods and computer program products for adjusting trace points based on overhead analysis. Various embodiments provide a method to compare calculated overhead to one or more thresholds and adjust a number of active trace points based on the comparison.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for adjusting trace points based on overhead analysis.

In one general embodiment, a computer-implemented method includes identifying an overhead associated with a tracing of a system, comparing the overhead to a predetermined threshold, and adjusting a number of trace points currently enabled within the system, based on the comparing.

In another general embodiment, a computer program product for adjusting a number of trace points currently enabled within a system, based on an analysis of an overhead, comprises a computer readable storage medium having program instructions embodied therewith, wherein the computer readable storage medium is not a transitory signal per se, and where the program instructions are executable by a processor to cause the processor to perform a method comprising identifying the overhead associated with a tracing of a system, utilizing the processor, comparing the overhead to a predetermined threshold, utilizing the processor, and adjusting the number of the trace points currently enabled within the system, utilizing the processor, based on the comparing.

In another general embodiment, a system includes a processor, and logic integrated with the processor, executable by the processor, or integrated with and executable by the processor, the logic being configured to identify an overhead associated with a tracing of a system, compare the overhead to a predetermined threshold, and adjust a number of trace points currently enabled within the system, based on the comparison.

Figure 1:
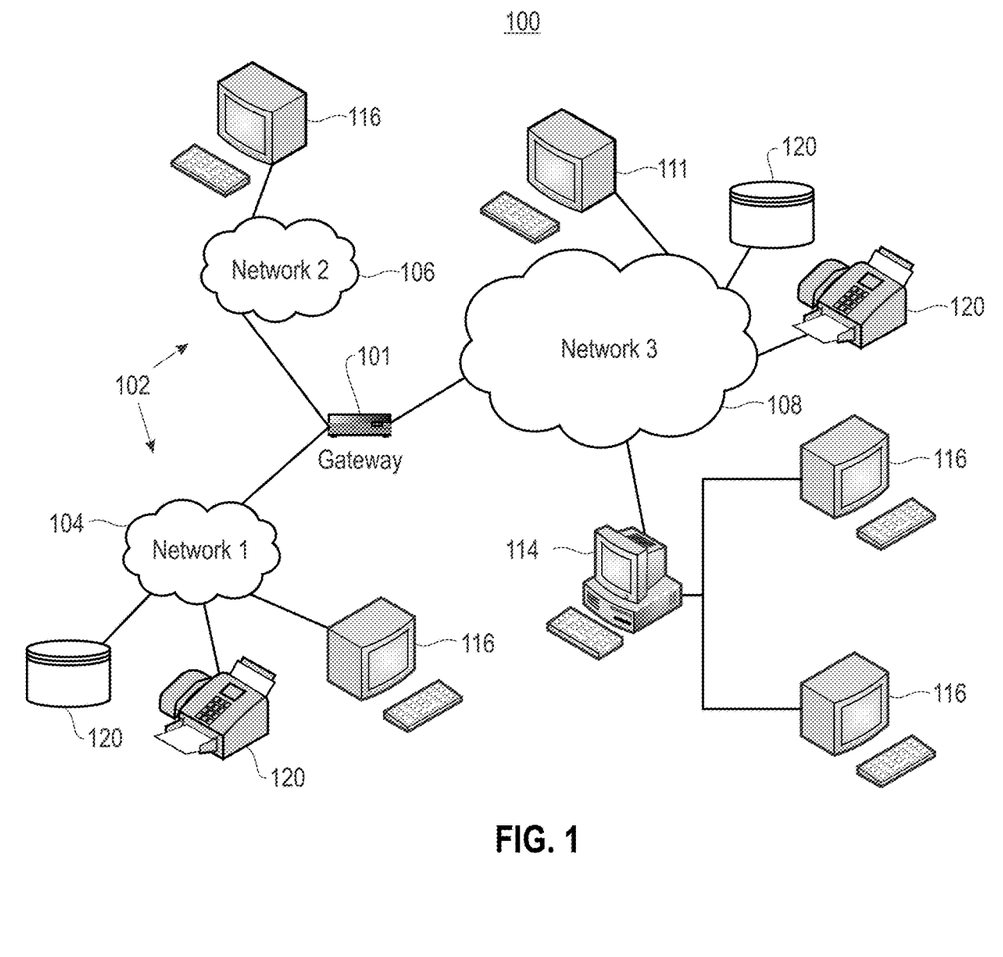
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
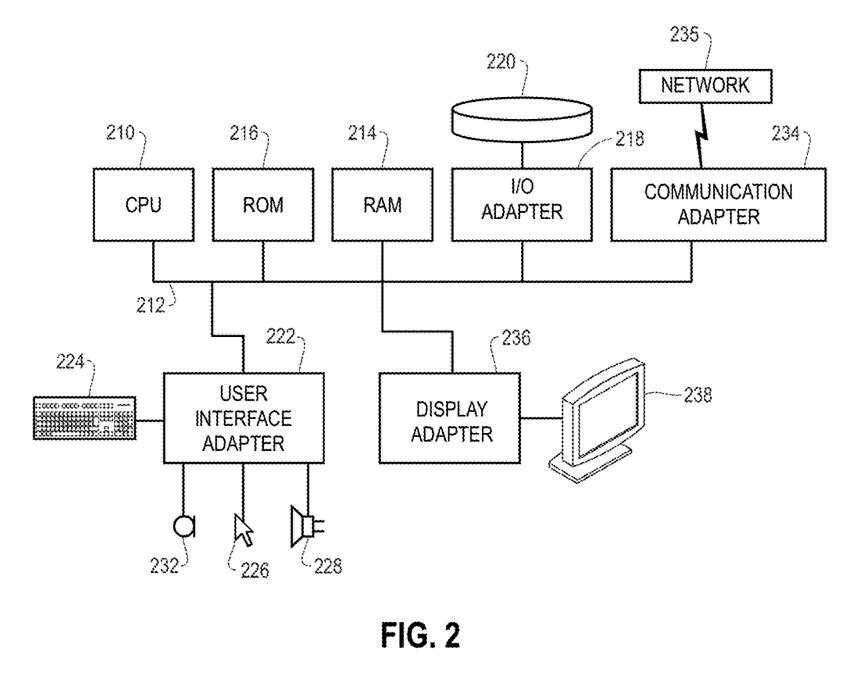
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
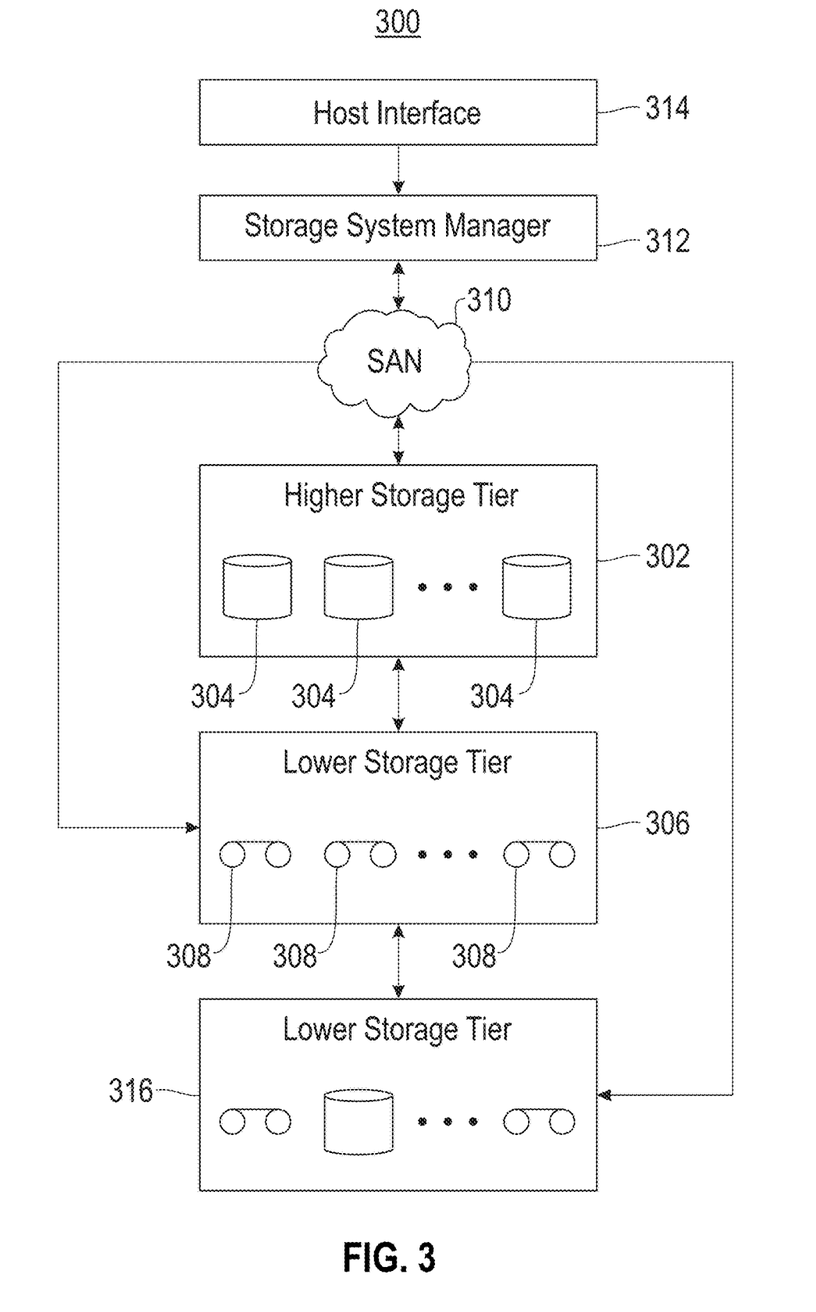
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
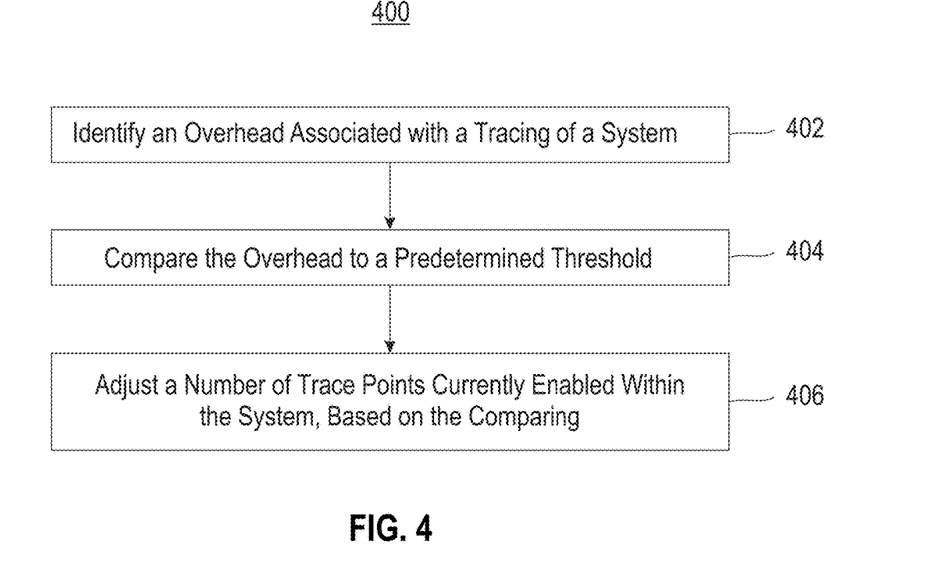
FIG. 4 illustrates a method for adjusting trace points based on overhead analysis, in accordance with one embodiment.

Now referring to FIG. 4, a flowchart of a method 400 is shown according to one embodiment. The method 400 may be performed in accordance with the present invention in any of the environments depicted in FIGS. 1-3 and 5, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where an overhead associated with a tracing of a system is identified. In one embodiment, the overhead may be monitored by a module of the system (e.g., an overhead meter of the system, etc.). In another embodiment, the overhead may indicate an amount of additional resource usage within the system. For example, the overhead may indicate an amount of central processing unit (CPU) usage within the system, an amount of memory usage within the system, an amount of input/output (I/O) bandwidth usage within the system, etc.

Also, in one embodiment, the overhead may be identified by comparing a first resource usage of the system when tracing of the system is performed against a second resource usage of the system when tracing of the system is not performed. For example, the overhead may include the difference between the first resource usage and the second resource usage. In another embodiment, the overhead may be identified by comparing a first latency of the system when tracing of the system is performed against a second latency of the system when tracing of the system is not performed. For example, the overhead may include the difference between the first latency and the second latency.

Additionally, in one embodiment, the overhead may indicate a current performance of the system. For example, the overhead may indicate a number of operations per second that are performed by the system, etc. In another embodiment, the overhead may be reported by one or more trace points within code that are executed by the system. For example, the one or more trace points may report how frequently they are executed, the amount of resources they utilize, etc.

Further, in one embodiment, the overhead may be reported by software being run by the system. For example, the software may report its latency to the system. In another example, the software may report its throughput profile to the system.

Further, as shown in FIG. 4, method 400 may proceed with operation 404, where the overhead is compared to a predetermined threshold. In one embodiment, the comparison may be performed by one or more modules of the system (e.g., a trace manager of the system, etc.). In another embodiment, the predetermined threshold may include a maximum allowable overhead for the system.

Also, in one embodiment, the predetermined threshold may be determined and submitted to the system by one or more users. For example, a system administrator may submit the predetermined threshold may be received by the system from a system administrator using a graphical user interface (GUI) of the system. In another embodiment, the predetermined threshold may be calculated (e.g., either automatically or by one or more users, etc.) based on one or more requirements of the system, one or more requirements of software running on the system, etc.

In addition, as shown in FIG. 4, method 400 may proceed with operation 406, where a number of trace points currently enabled within the system are adjusted, based on the comparing. In one embodiment, each of the trace points may include a portion of code within an application being run by the system, where the portion of code performs one or more actions when it is run within the application by the system. For example, when run, each of the trace points may output (e.g., send, display, etc.) application information, time information, resource usage information, etc. In another example, the output of the trace points may be stored (e.g., by one or more storage resources of the system, etc.).

Furthermore, in one embodiment, adjusting the number of trace points may be performed by one or more modules of the system (e.g., the trace manager of the system, etc.). In another embodiment, adjusting the number of trace points may include reducing the number of trace points that are currently enabled within the system when it is determined that the overhead exceeds the predetermined threshold, when the predetermined threshold indicates a maximum allowable overhead. In yet another embodiment, the system may continue to disable an increasing number of trace points that are currently enabled until the overhead is below the predetermined threshold.

Further still, in one embodiment, the number of trace points may be reduced by the system by disabling one or more trace points that are currently enabled within the system. In another embodiment, one or more trace points may be disabled according to a predetermined list. For example, an importance of each trace point may be indicated to the system by a user (e.g., when the trace point is created, etc.), and all trace points within an application may then be ranked according to their associated importance. In another example, all trace points that are currently enabled may be compared to the predetermined list. In yet another example, a predetermined number of trace points may be disabled, where trace points having a lower importance on the list may be disabled before trace points having a higher importance on the list.

Also, in one embodiment, one or more trace points may be disabled intelligently. For example, it may be determined that a predetermined component of the system is associated with a current system issue (e.g., by performing a live trace of one or more trace points, etc.). In another example, a predetermined number of enabled trace points that are determined to be associated with components of the system other than the predetermined component may be disabled before other trace points.

In addition, in one embodiment, adjusting the number of trace points may include increasing the number of trace points that are currently enabled within the system when it is determined that the overhead is below the predetermined threshold, when the predetermined threshold indicates a maximum acceptable overhead. In yet another embodiment, the system may continue to increase an increasing number of trace points that are currently disabled until the overhead is above the predetermined threshold (or is a predetermined amount from the threshold, etc.).

Further, in one embodiment, the number of trace points may be increased by the system by enabling one or more trace points that are currently disabled by the system. In another embodiment, one or more trace points may be enabled according to a predetermined list. For example, an importance of each trace point may be indicated to the system by a user (e.g., when the trace point is created, etc.), and all trace points within an application may then be ranked according to their associated importance. In another example, all trace points that are currently disabled may be compared to the predetermined list. In yet another example, a predetermined number of trace points may be enabled, where trace points having a higher importance on the list may be enabled before trace points having a lower importance on the list.

Further still, in one embodiment, one or more trace points may be enabled intelligently. For example, it may be determined that a predetermined component of the system is associated with a current system issue (e.g., by performing a live trace of one or more trace points, etc.). In another example, a predetermined number of disabled trace points that are determined to be associated with the predetermined component may be enabled before other trace points.

Also, in one embodiment, the system may include a distributed system (e.g., a plurality of distributed machines, etc.). In another embodiment, it may be determined that a predetermined machine or subset of machines of the distributed system is associated with a current system issue (e.g., by performing a live trace of one or more trace points, etc.). In yet another embodiment, in response to the determination, one or more trace points associated with machines of the distributed system other than the predetermined machine may be disabled when it is determined that the overhead exceeds the predetermined threshold, when the predetermined threshold indicates a maximum allowable overhead. In still another embodiment, in response to the determination, one or more trace points associated with the predetermined machine may be enabled when it is determined that the overhead is below the predetermined threshold, when the predetermined threshold indicates a minimum desired overhead.

Additionally, in one embodiment, a live analysis of results of currently enabled trace points may be performed within the system. In another embodiment, only trace results that meet one or more predetermined criteria (e.g., that have a relevance to one or more predetermined issues, etc.) may be stored within the system. In yet another embodiment, one or more trace points may be enabled and/or disabled based on the live analysis.

In this way, a number of trace points currently enabled within the system may be dynamically adjusted, based on a comparison of a current overhead of the system to one or more thresholds.

Figure 5:
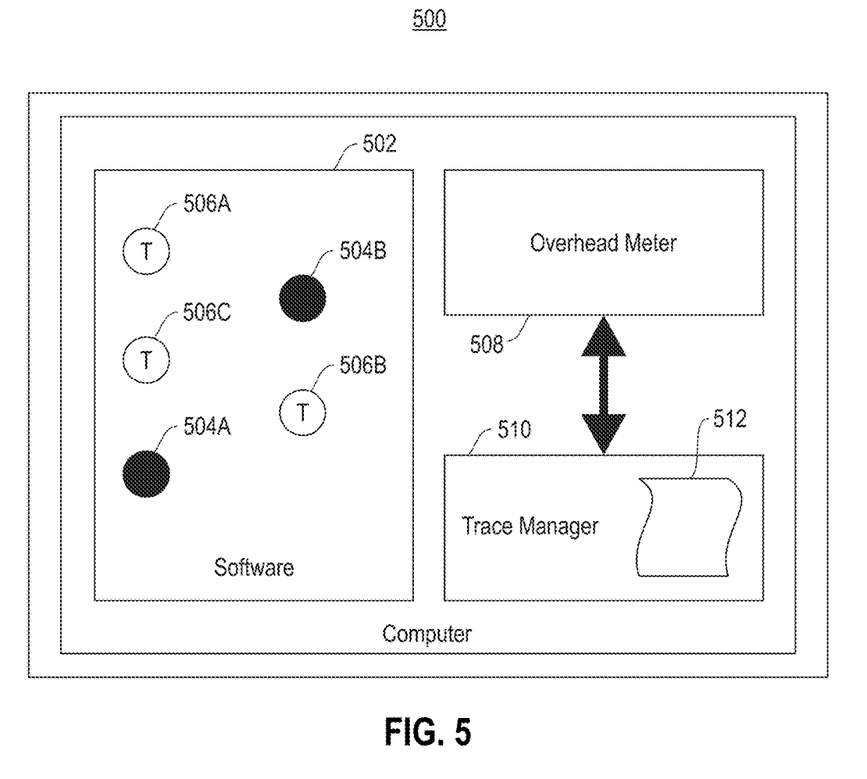
FIG. 5 illustrates a method for performing trace point management, in accordance with one embodiment.

FIG. 5 discloses an exemplary system 500 for performing trace point management, according to one exemplary embodiment. As shown, the system 500 runs an instance of software 502 having a plurality of active trace points 504A-B and a plurality of inactive trace points 506A-C. Additionally, the system 500 runs an overhead meter 508 and a trace manager 510. In one embodiment, the overhead meter 508 may estimate an amount of overhead associated with the performance of the system 500 that is caused by the tracing being performed during the running of the software 502 by the active trace points 504A-B. In another embodiment, overhead may be measured in multiple different ways. For example, overhead may be measured based on resource usage (e.g., CPU, memory, I/O bandwidth, etc.), relative performance degradation (e.g., ops/sec, etc.), etc.

In one embodiment, the active trace points 504A-B and inactive trace points 506A-C may be statically compiled, and may be enabled or disabled dynamically. In another embodiment, the active trace points 504A-B and inactive trace points 506A-C may be dynamically added at runtime (e.g., by using a kprobes mechanism, etc.). In yet another embodiment, the active trace points 504A-B and inactive trace points 506A-C may be grouped by a detalization level or by an associated component.

In another embodiment, the active trace points 504A-B may create one or more trace records. For example, the trace records may be timestamped to determine the order in which corresponding events occur in software 502 running on the system 500 and may be used to reconstitute how the system 500 is functioning. In addition to a timestamp, the trace records may include information that is specific to a location of active trace points 504A-B. For example, if one of the active trace points 504A-B is placed at a location in the software 502 code that submits an I/O request to the hard disk drive, then a request size, a type of the operation (e.g., read, write, etc.), and an offset on the disk may be added to the trace record. Such information may allow the system 500 to perform in-depth trace analysis.

Additionally, in one embodiment, trace-point groups may be enabled or disabled as a whole and not on a per-trace-point basis. In another embodiment, the instance of software 502 may be included within several independent software pieces working on the same system (e.g., operating system, middleware, storage, etc.) and each software piece may use different tracing mechanisms.

Further, in one embodiment, the overhead meter 508 may send the estimated amount of overhead to the trace manager 510. In another embodiment, the trace manager 510 may compare the received estimated amount of overhead to one or more thresholds indicated in a user configuration 512. For example, the user configuration 512 may include one or more of a maximum allowable overhead and a minimum desired overhead.

Further still, in one embodiment, if the trace manager 510 determines that the received estimated amount of overhead exceeds a maximum allowable overhead indicated in the user configuration 512, the trace manager 510 may disable one or more of the plurality of active trace points 504A-B within the software 502. In another embodiment, if the trace manager 510 determines that the received estimated amount of overhead is below a minimum desired overhead indicated in the user configuration 512, the trace manager 510 may enable one or more of the plurality of inactive trace points 506A-C within the software 502.

In one embodiment, the trace manager 510 may be a general component that allows the enabling or disabling of the active trace points 504A-B and inactive trace points 506A-C or trace-point groups. In another embodiment, the active trace points 504A-B and inactive trace points 506A-C may be activated and deactivated automatically, based on an overhead level specified by a user in the user configuration 512.

Also, in one embodiment, the overhead meter 508 may measure the overhead of tracing. For example, active trace points 504A-B may report how frequently they are executed and how much of one or more resources (e.g., CPU time, memory, etc.) they utilize to the overhead meter 508. In other example, the overhead meter 508 may measure the resource utilization with and without tracing and may deduce tracing overhead from this information. In yet another example, the software 502 may report its latency or throughput profile to the overhead meter 508. The overhead meter 508 may measure if enabling or disabling active trace points 504A-B and inactive trace points 506A-C increases or decreases performance of the system 500. In some scenarios, a calibration phase may be needed to determine overheads.

Additionally, in one embodiment, a user may specify the overhead in the user configuration 512 either as a performance penalty (e.g., do not increase the latency by more than 10%) or using utilization of one or more resources of the system 500 (e.g., do not exceed CPU utilization by 30%). In another embodiment, the overhead meter 508 may constantly monitor performance of the system 500 and may report it to the trace manager 510. If user specified limits disclosed in the user configuration 512 are exceeded, the trace manager 510 may deactivate one or more of the active trace points 504A-B.

Furthermore, in one embodiment, one or more approaches may be used to select active trace points 504A-B to disable. For example, the software 502 may provide every trace point with an annotation of its importance level. The trace manager 510 may then eliminate one or more active trace points 504A-B in the increasing order of their importance. In this way, the most important trace information may remain collected even under an increasingly heavy resource utilization.

Further still, in one embodiment, the decision on which of the active trace points 504A-B and inactive trace points 506A-C to activate or deactivate is taken online by the analysis of live traces. For example, based on a live trace, it may become evident that a storage component of the system 500 causes an issue. In response, active trace points 504A-B are removed from all subsystems except the storage subsystem, which, instead gets the majority of associated inactive trace points 506A-C enabled.

This scenario may also be extended to a multi-node setup, where after an initial online analysis, it is determined that only a small subset of machines are guilty of poor performance. In response, trace points outside of the subset may be disabled and trace points within the subset may be enabled.

In this way, when the load on the system 500 is light, tracing may work at a full detalization level. However, as load increases and active trace points 504A-B may start creating higher overhead, some less important trace points may be disabled. This may be achieved by dynamically measuring performance overhead caused by tracing and dynamically activating and deactivating active trace points 504A-B and inactive trace points 506A-C to keep tracing overhead within desired limits.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   identifying an overhead associated with a tracing of a system, including:
      receiving, from each of a plurality of trace points currently enabled within the system, a frequency of execution for the trace point and an amount of processor time and memory utilized by the trace point, and
      determining the overhead, based on the frequency of execution for the plurality of trace points and the amount of processor time and memory utilized by the plurality of trace points;
   comparing the overhead to a predetermined threshold, where the predetermined threshold is automatically calculated based on one or more requirements of software running on the system; and
   adjusting a number of trace points currently enabled within the system, based on the comparing, including:
      identifying, for each of the plurality of trace points currently enabled within the system, an importance level included within an annotation of the trace point,
      ranking the plurality of trace points currently enabled within the system according to their importance level, determining that a predetermined component of the system is associated with a current system issue by performing a live trace of one or more of the plurality of trace points currently enabled within the system, in response to determining that the overhead exceeds the predetermined threshold, disabling one or more of the plurality of trace points currently enabled within the system, where:

trace points within the plurality of trace points currently enabled within the system that are determined to be associated with components of the system other than the predetermined component of the system associated with the current system issue are disabled before trace points currently enabled within the system that are determined to be associated with the predetermined component of the system associated with the current system issue, and trace points within the plurality of trace points currently enabled within the system that have a lower importance level within the ranking are disabled before trace points that have a higher importance level within the ranking.

2. The computer-implemented method of claim 1, wherein adjusting the number of trace points currently enabled within the system further comprises, in response to determining that the overhead is below the predetermined threshold, enabling one or more of a plurality of additional trace points currently disabled within the system until the overhead is a predetermined amount from the predetermined threshold, where:

additional trace points within the plurality of additional trace points currently disabled within the system that are determined to be associated with the predetermined component of the system associated with the current system issue are enabled before additional trace points within the plurality of additional trace points currently disabled within the system that are determined to be associated with components of the system other than the predetermined component of the system associated with the current system issue, each of the plurality of additional trace points currently disabled within the system are ranked with the plurality of trace points currently enabled within the system according to their importance level, and additional trace points within the plurality of additional trace points currently disabled within the system that have a higher importance level within the ranking are enabled before additional trace points that have a lower importance level within the ranking.

3. The computer-implemented method of claim 1, wherein the predetermined threshold includes a maximum allowable overhead for the system.

4. The computer-implemented method of claim 1, wherein the predetermined threshold indicates a maximum allowable overhead.

5. The computer-implemented method of claim 1, wherein adjusting the number of the trace points currently enabled within the system includes increasing the number of the trace points currently enabled within the system in response to determining that the overhead is below the predetermined threshold.

6. The computer-implemented method of claim 5, wherein the number of the trace points is increased by enabling one or more additional trace points currently disabled within the system.

7. The computer-implemented method of claim 6, wherein the one or more additional trace points currently disabled within the system that are enabled have a higher importance on a predetermined list than the additional trace points currently disabled within the system that are not enabled.

8. A computer program product for adjusting a number of trace points currently enabled within a system, based on an analysis of an overhead, the computer program product comprising a computer readable storage medium having program instructions embodied therewith, wherein the computer readable storage medium is not a transitory signal per se, the program instructions executable by a processor to cause the processor to perform a method comprising:

identifying the overhead associated with a tracing of a system, utilizing the processor, including:

receiving, from each of a plurality of trace points currently enabled within the system, a frequency of execution for the trace point and an amount of processor time and memory utilized by the trace point, and determining the overhead, based on the frequency of execution for the plurality of trace points and the amount of processor time and memory utilized by the plurality of trace points;

comparing the overhead to a predetermined threshold, utilizing the processor, where the predetermined threshold is automatically calculated based on one or more requirements of software running on the system; and adjusting the number of the trace points currently enabled within the system, utilizing the processor, based on the comparing, including:

identifying, for each of the plurality of trace points currently enabled within the system, an importance level included within an annotation of the trace point, ranking the plurality of trace points currently enabled within the system according to their importance level, determining that a predetermined component of the system is associated with a current system issue by performing a live trace of one or more of the plurality of trace points currently enabled within the system, in response to determining that the overhead exceeds the predetermined threshold, disabling one or more of the plurality of trace points currently enabled within the system, where:

trace points within the plurality of trace points currently enabled within the system that are determined to be associated with components of the system other than the predetermined component of the system associated with the current system issue are disabled before trace points currently enabled within the system that are determined to be associated with the predetermined component of the system associated with the current system issue, and trace points within the plurality of trace points currently enabled within the system that have a lower importance level within the ranking are disabled before trace points that have a higher importance level within the ranking.

9. The computer program product of claim 8, wherein adjusting the number of trace points currently enabled within the system further comprises, in response to determining that the overhead is below the predetermined threshold, enabling, utilizing the processor, one or more of a plurality of additional trace points currently disabled within the system until the overhead is a predetermined amount from the predetermined threshold, where:

additional trace points within the plurality of additional trace points currently disabled within the system that are determined to be associated with the predetermined component of the system associated with the current system issue are enabled before additional trace points within the plurality of additional trace points currently disabled within the system that are determined to be associated with components of the system other than the predetermined component of the system associated with the current system issue,     each of the plurality of additional trace points currently disabled within the system are ranked with the plurality of trace points currently enabled within the system according to their importance level, and     additional trace points within the plurality of additional trace points currently disabled within the system that have a higher importance level within the ranking are enabled before additional trace points that have a lower importance level within the ranking.

10. The computer program product of claim 8, wherein the predetermined threshold includes a maximum allowable overhead for the system.

11. The computer program product of claim 8, wherein the predetermined threshold indicates a maximum allowable overhead.

12. The computer program product of claim 8, wherein adjusting the number of the trace points currently enabled within the system includes increasing the number of the trace points currently enabled within the system, utilizing the processor, in response to determining that the overhead is below the predetermined threshold.

13. The computer program product of claim 12, wherein the number of the trace points is increased by enabling one or more additional trace points currently disabled within the system, utilizing the processor.

14. A system, comprising:
    a processor; and
    logic integrated with the processor, executable by the processor, or integrated with and executable by the processor, the logic being configured to:
    identify an overhead associated with a tracing of a system, including:

receiving, from each of a plurality of trace points currently enabled within the system, a frequency of execution for the trace point and an amount of processor time and memory utilized by the trace point, and     determining the overhead, based on the frequency of execution for the plurality of trace points and the amount of processor time and memory utilized by the plurality of trace points;

compare the overhead to a predetermined threshold, where the predetermined threshold is automatically calculated based on one or more requirements of software running on the system; and adjust a number of trace points currently enabled within the system, based on the comparison, including:

identifying, for each of the plurality of trace points currently enabled within the system, an importance level included within an annotation of the trace point,     ranking the plurality of trace points currently enabled within the system according to their importance level,     determining that a predetermined component of the system is associated with a current system issue by performing a live trace of one or more of the plurality of trace points currently enabled within the system,     in response to determining that the overhead exceeds the predetermined threshold, disabling one or more of the plurality of trace points currently enabled within the system, where:

trace points within the plurality of trace points currently enabled within the system that are determined to be associated with components of the system other than the predetermined component of the system associated with the current system issue are disabled before trace points currently enabled within the system that are determined to be associated with the predetermined component of the system associated with the current system issue, and         trace points within the plurality of trace points currently enabled within the system that have a lower importance level within the ranking are disabled before trace points that have a higher importance level within the ranking.

\* \* \* \* \*